(12) United States Patent
Gehring et al.

(10) Patent No.: US 7,805,113 B2
(45) Date of Patent: Sep. 28, 2010

(54) CIRCUIT AND METHOD FOR SELECTABLE HIGH/LOW SIDE INJECTION IN AN INTERMEDIATE FREQUENCY TRANSCEIVER

(75) Inventors: Mark R. Gehring, Portland, OR (US); Russell R. Moen, Tigard, OR (US)

(73) Assignee: Cypress Semiconductor Corporation, San Jose, CA (US)

( * ) Notice: Subject to any disclaimer, the term of this patent is extended or adjusted under 35 U.S.C. 154(b) by 513 days.

(21) Appl. No.: 11/427,712

(22) Filed: Jun. 29, 2006

(65) Prior Publication Data

US 2007/0004370 A1 Jan. 4, 2007

Related U.S. Application Data

(60) Provisional application No. 60/696,229, filed on Jun. 30, 2005.

(51) Int. Cl.
*H04B 1/44* (2006.01)
(52) U.S. Cl. ............................ 455/78; 455/76; 455/260; 455/118; 455/262; 455/323
(58) Field of Classification Search ................... 455/78, 455/76, 260, 118, 262, 323
See application file for complete search history.

(56) References Cited

U.S. PATENT DOCUMENTS

| | | | |
|---|---|---|---|
| 2,928,055 A | 8/1960 | Weaver Jr. | |
| 4,653,117 A | 3/1987 | Heck | |
| 4,944,025 A | 7/1990 | Gehring et al. | |
| 5,230,088 A | 7/1993 | Kramer, Jr. et al. | |
| 5,471,652 A * | 11/1995 | Hulkko ........................ | 455/76 |
| 5,598,405 A | 1/1997 | Hirose | |
| 5,718,234 A | 2/1998 | Warden et al. | |
| 5,850,597 A | 12/1998 | Tanaka et al. | |
| 5,854,621 A | 12/1998 | Junod et al. | |
| 6,097,305 A | 8/2000 | Im et al. | |
| 6,211,747 B1 | 4/2001 | Tricket et al. | |
| 6,434,178 B1 | 8/2002 | Ubukata | |
| 7,174,136 B2 * | 2/2007 | Marshall et al. ............... | 455/78 |
| 7,272,374 B2 * | 9/2007 | Tuttle et al. .................. | 455/333 |
| 2002/0122465 A1 | 9/2002 | Agee et al. | |

OTHER PUBLICATIONS

Usptosearch Authority; PCT/US06/25798 International Search Report; Aug. 23, 2007; 12 Pages.
The Written Opinion of the International Searching Authority for International Application No. PCT/US06/25798 dated Aug. 23, 2007; 6 pages.
USPTO Notice of Allowance for U.S. Appl. No. 09/179,212 (ALA98001) dated Mar. 25, 2002; 3 pages.
USPTO Non-Final Rejection for U.S. Appl. No. 09/179,212 (ALA98001) dated Sep. 13, 2001; 8 pages.

* cited by examiner

*Primary Examiner*—Sanh D Phu

(57) ABSTRACT

A method of communication between a first transceiver having a first local oscillator set at a first frequency and a second transceiver having a second local oscillator set at a second frequency disclosed. The method includes transmitting a first signal at a first frequency from the first transceiver to the second transceiver, transmitting a second signal at the second frequency from the second transceiver to the first transceiver, and receiving the second signal at the first transceiver. The method further includes maintaining the first local oscillator at the first frequency and the second local oscillator at the second frequency during the transmitting of the first signal, during the receiving of the first signal, during the transmitting of the second signal, and during the receiving of the second signal.

12 Claims, 3 Drawing Sheets

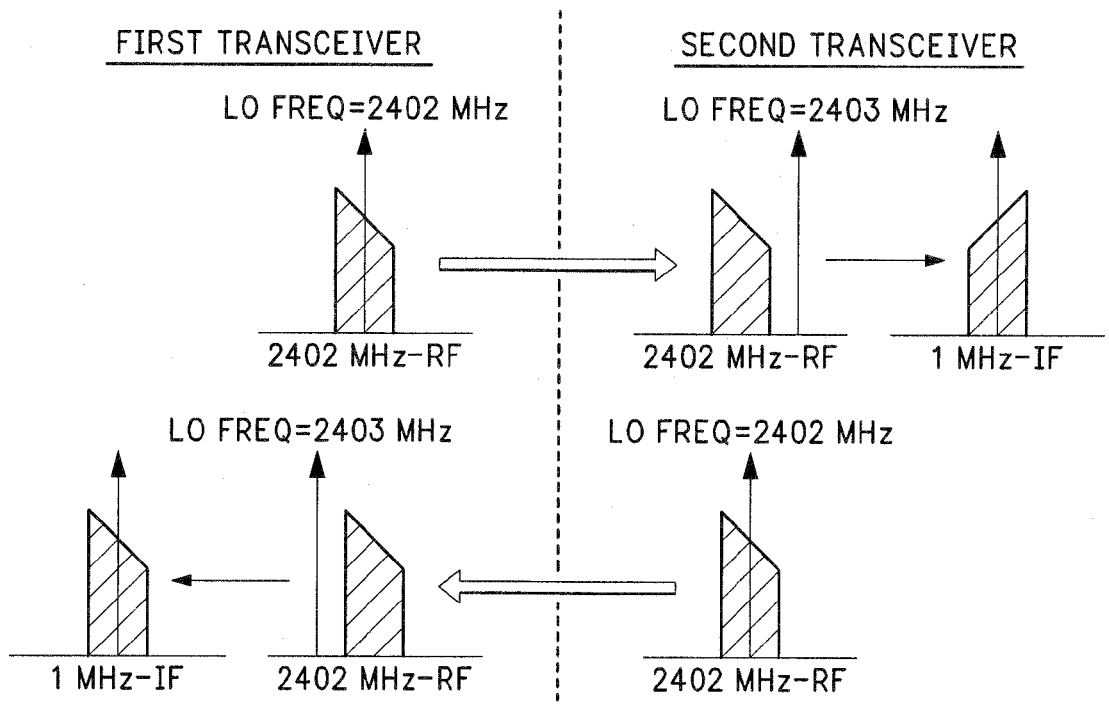
FIG.1
(CONVENTIONAL)

CIRCUIT AND METHOD FOR SELECTABLE HIGH/LOW SIDE INJECTION IN AN INTERMEDIATE FREQUENCY TRANSCEIVER

CROSS REFERENCE TO RELATED APPLICATIONS

This application claims the benefit of U.S. Provisional Application No. 60/696,229, which was filed on 30 Jun. 2005. U.S. Provisional Application No. 60/696,229 is incorporated by reference in its entirety.

BACKGROUND

1. Technical Field

This disclosure relates generally to electronic circuits, and in particular, to circuits for wireless communication.

2. Description of the Related Art

In a radio receiver, selectivity is an important specification for systems employing multiple frequency channels (e.g., the 2.4 GHz Industrial, Scientific, and Medical (ISM) band). Selectivity is the ability to receive the desired channel frequency (desired, Fd) in the presence of other signals having undesired channel frequencies (undesired, Fu). This is analogous to a person listening to a conversation taking place across the room in a room-full of conversations.

One method of rejecting the Fu (and only "listening" to Fd) is accomplished with a Band-Pass Filter (BPF), which only allows Fd to pass through it for further processing by the radio circuitry. It can be very difficult and/or expensive to design a BPF at the incoming RF frequency (in this case, 2.4 GHz).

For example, if the channel frequencies are spaced 1 MHz apart, the BPF bandwidth would have to be approximately 1 MHz to reject the other channels. This would require a Q of 2,400 for a Radio Frequency (RF) BPF (2.4 GHz/1 MHz) but only a Q of 10 for a BPF with an Intermediate Frequency (IF) of 10 MHz (10 MHz/1 MHz). It can be difficult and expensive to design an RF BPF with a Q of 2,400, hence the need to create an IF and perform the filtering at the IF.

In many low IF transceivers, the transmitter is on the same frequency as the Local Oscillator (LO), but the receiver is not. The receiver LO must be moved by a frequency increment equal to the IF frequency, when compared to the transmitter LO. Assuming that there is only one local oscillator, this requires that the Phase-Locked Loop (PLL) of the frequency synthesizer be re-locked.

A conventional technique in radio design is to use a Mixer to perform frequency translation (i.e., multiplying two frequencies (F1, F2) to obtain the sum and difference frequencies (Fout)=M*F1+/-N*F2 (where M or N=1, 2, 3, . . .)=F1+F2, F1-F2, 2*F1+/-F2, 2*F2+/-F1, 3*F1+/-2*F2, etc.).

A simple case is where a user wants to convert an incoming RF signal (e.g., $F_{RF}$=2.402 GHz) to an IF (e.g., 1 MHz). This is accomplished by mixing $F_{RF}$ with a local oscillator frequency (LO) of $F_{LO}$=2.401 GHz. Note that $F_{RF}$ is 1 MHz "above" $F_{LO}$. Now observe that $F_{RF}$=2.400 GHz (1 MHz "below" the LO) also produces a difference frequency of 1 MHz (actually, -1 MHz, which is described as +1 MHz with a spectrum inversion). Thus, 2.400 GHz is the "image" ($F_{Image}$) of $F_{RF}$=2.402 GHz for an $F_{LO}$ of 2.401 GHz and an IF of 1 MHz.

Radios employing mixers for frequency translation are susceptible to interference from their image frequency. There are conventional techniques, such as the use of image canceling mixers that can obviate this susceptibility. For an IF of 2 MHz and $F_{LO}$=2.401 GHz (unchanged), $F_{RF}$=2.403 GHz and $F_{Image}$=2.399 GHz. Also note the roles of $F_{RF}$ and $F_{Image}$ can be reversed depending on which RF signal is the frequency one wishes to receive. Alternatively, one can use a zero IF receiver, which has no image.

An illustration of this conventional requirement to re-lock the PLL is illustrated in FIG. 1, where FIG. 1 is a block diagram illustrating a method of communication between two transceivers according to a conventional technique.

Referring to FIG. 1, the operation of the first transceiver is illustrated on the left side of the dotted line, while the operation of the second transceiver is illustrated on the right side of the dotted line. Both the first and second transceiver include only a single LO. The transmitters of the first and second transceivers will always transmit at the frequency of their corresponding LO.

Initially, the first transceiver transmits to the second transceiver (upper left corner to upper right corner of FIG. 1) at 2402 MHz. The receiver of the second transceiver is set to receive at 2402 MHz, but the LO of the second transceiver is set to 2403 MHz in order to perform the mixing operation to downconvert the received signal to 1 MHz IF.

The first transceiver expects to receive an acknowledgement from the second transceiver that the signal from the first transceiver was received. Since the first transceiver expects to receive a signal from the second transceiver at 2403 MHz, both the first and second transceivers must change the frequency of their respective LO after the first transceiver transmits to the second transceiver.

That is, the second transceiver must change the frequency of its LO from 2403 MHz to 2402 MHz to transmit to the first transceiver. Likewise, the first transceiver must change the frequency of its LO from 2402 MHz to 2403 MHz in order to perform the mixing operation to downconvert the received signal from the second transceiver to 1 MHz IF.

According to the conventional technique described above, each time that a data burst is sent there must be at least one change of LO frequency for both the first transceiver and the second transceiver. Changing the LO frequency, however, may require a significant amount of time because the PLL cannot instantly be set to the new frequency. There is always some time required for the PLL to stabilize at the new LO frequency. The re-locking of the PLL with each change of LO frequency implies some latency in the delivery of data. The additional time required to re-lock the PLL also means that the first and second transceivers must be powered for a longer amount of time for each data burst, which negatively affects current consumption and battery life.

Another conventional solution is to have two independent LOs, one LO for receiving and one LO for transmitting. However, this conventional solution requires more power consumption and chip area, which are also undesirable. Also, there is design difficulty due to possible interactions ("pulling") between the two oscillators.

It would be desirable to have a faster PLL lock time with lower current consumption. A lower power PLL is desirable in battery powered applications and faster lock time is desirable also when you transmit/receive data in short bursts where long lower power idle times and/or PLL lock times are a significant fraction of the time it takes to transmit/receive a data packet.

Embodiments of the invention address these and other disadvantages of the related art.

BRIEF DESCRIPTION OF THE DRAWINGS

FIG. 1 is a block diagram illustrating a method of communication between two transceivers according to a conventional technique.

DETAILED DESCRIPTION

In the paragraphs below, methods and circuits for improved selectable high/low side injection enabling fast turn around in a low IF transceiver is described in accordance with some embodiments of the invention. Embodiments of the invention improve over conventional solutions by taking advantage of the image frequency of a receiver.

According to embodiments of the invention, a heterodyne receiver uses an Intermediate Frequency (IF) at which to detect (demodulate) the signal. In many modern integrated receivers, the IF is typically from 1 to 3 MHz, and is sometimes referred to as "low IF" because the IF frequency is roughly on the order of the channel spacing of the system. "Low IF" is a relative term, so it should not be interpreted as applying to any particular frequency range.

Using a 1 MHz IF in a 2.4 GHz band device as an example, a low IF receiver has a LO that is tuned to (in one example embodiment) 2403 MHz. This local oscillator is injected into a mixer, which generates, as its output, the sum and difference frequencies based upon the LO and RF inputs.

In the hypothetical example above, an incoming RF signal at 2.402 GHz is mixed down to the 1 MHz IF (2403 MHz−2402 MHz) and detected. However, an incoming RF signal at 2.404 GHz may also be mixed down to the −1 MHz IF (2403 MHz−2404 MHz) and detected. This gives rise to two different situations, depending on which one of the incoming RF signals has the desired channel frequency Fd.

A high-side injection situation is one where the LO frequency is above the desired RF frequency. In this case, the desired RF channel frequency Fd would be 2402 MHz, the LO frequency is 2403 MHz, and the undesired frequency Fu (or image frequency) would be 2404 MHz, since the output of the mixer would be −1 MHz if the RF input was 2404 MHz (2403 MHz−2404 MHz). High-side injection refers to the fact that the LO frequency is above the desired RF frequency.

A low-side injection situation is one where the LO frequency is below the desired RF frequency. In this case, the desired RF channel frequency Fd would be 2404 MHz, the LO frequency is 2403 MHz, and the undesired frequency Fu (or image frequency) would be 2402 MHz. Low-side injection refers to the fact that the LO frequency is below the desired RF frequency.

Figure 2:
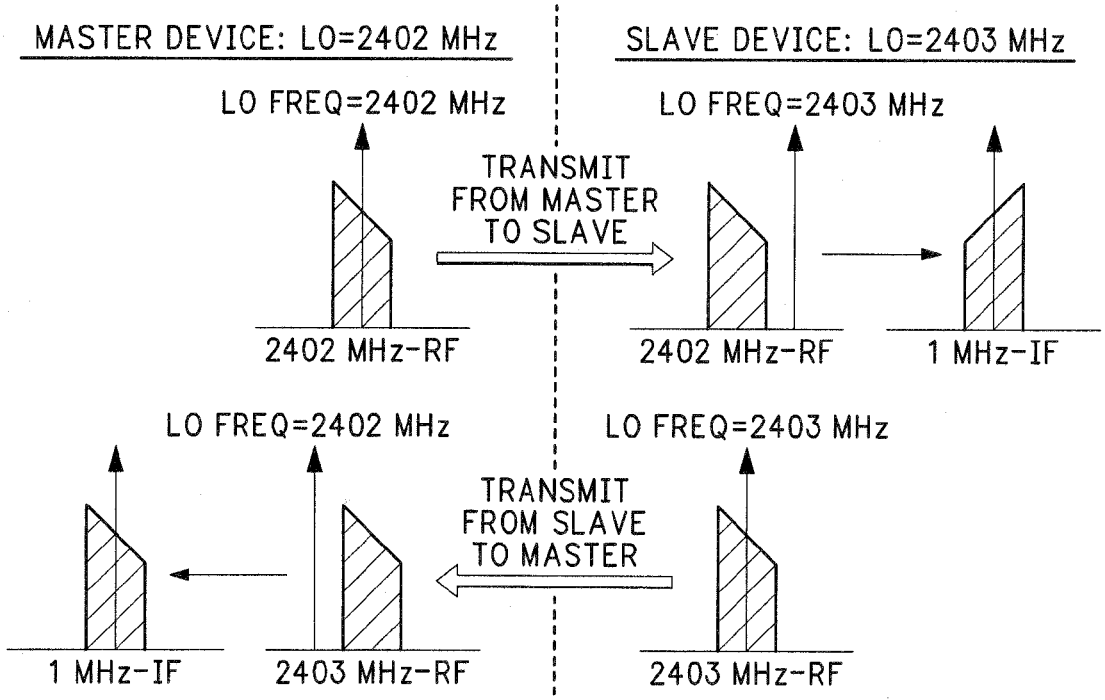
FIG. 2 is a diagram illustrating a method of selectable high/low side injection according to some embodiments of the invention.
Figure 3:
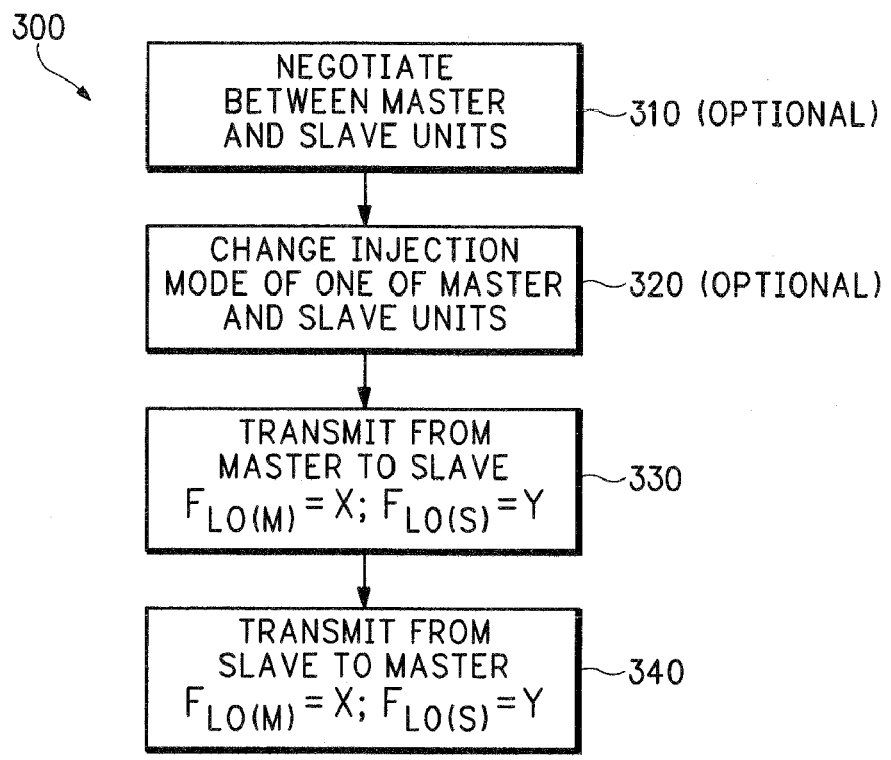
FIG. 3 is a flow diagram further illustrating the method of improved selectable high/low side injection that was described in FIG. 2.

FIG. 2 is a diagram illustrating a method of selectable high/low side injection according to some embodiments of the invention. FIG. 3 is a flow diagram further illustrating the method of improved selectable high/low side injection according to some embodiments of the invention.

Referring to FIG. 2, the operation of a master transceiver is illustrated on the left side of the dotted line, while the operation of a slave transceiver is illustrated on the right side of the dotted line. Both the master and slave transceivers include only a single LO. The transmitters of the master and slave transceivers will always transmit at the frequency of their corresponding LO.

In the master unit, the LO is set to 2402 MHz, and the slave unit should be set to receive at that frequency. The slave unit LO is set to 2403 MHz, and the incoming RF signal is downconverted to 1 MHz IF. The receiver of the slave unit is configured to reject the high-side image, and only receives the low-side signal. Compared to the original RF spectrum, the received spectrum at the slave device is inverted at the 1 MHz IF. In the case of FSK modulation the data will be inverted so that is easily handled with an inverter.

In the slave unit, the LO is set to 2403 MHz, and the master unit should be set to receive at that frequency. As was indicated above, the LO of the master unit is set to 2402 MHz, and the master unit will also downconvert the received signal to 1 MHz. However, the receiver of the master unit is configured to reject the low-side image, since it only desires to receive the high-side signal.

Thus, as illustrated in FIG. 2, the master unit is configured to perform low-side injection, while the slave unit is configured to perform high-side injection. This is in contrast with the conventional solution illustrated in FIG. 1, where both of the first and second transceivers are configured to perform high-side injection. Similarly, it is also conventional for both of the first and second transceivers to be configured to perform low-side injection.

To make a connection using this method, the master and slave devices preferably negotiate to determine which one of them will remain in its default injection state (maintains the same LO frequency) while the other one changes its injection mode (switches to a different LO frequency). In other words, one of the master and slave devices is set for low-side injection, while the other one of the master and slave devices is set for high-side injection.

For purposes of this disclosure, the terms master and slave indicate only that the master device is the one that performs the negotiation between the master and slave devices to determine which one of them will remain in the default injection state while the other one changes its injection mode and LO frequency. In some situations, the outcome of the negotiation may not require any changes among the master and slave devices, as they may already be configured in the appropriate manner, i.e., one of the master or slave units performs high-side injection, while the other one performs low-side injection.

In alternative embodiments of the invention, the negotiation process may be omitted altogether. This may occur, for example, when two devices that are meant to be used together are shipped from the factory and are pre-configured so that one device performs high-side injection and the other device performs low-side injection. An example of two such devices may be, for instance, a wireless keyboard and a USB dongle.

In preferred embodiments of the invention, since either unit could be the master or the slave unit, each one of the devices is capable of switching between high-side and low-side modes of injection. According to the described embodiments of the invention, the improved solution enables the LO frequency in each of the master and slave devices to remain at the same frequency for both the receive mode and the transmit mode.

FIG. 3 is a flow diagram further illustrating the method of improved selectable high/low side injection that was describe in FIG. 2. The flow diagram of FIG. 3 illustrates some exemplary processes in the method, but does not necessarily illustrate all processes in the method. Furthermore, all of the exemplary processes illustrated in FIG. 3 are not necessarily required to practice embodiments of the invention. That is, inventive aspects may exist in as few as one of the exemplary processes illustrated in FIG. 3.

Referring to FIG. 3, according to some embodiments of the invention negotiation occurs between the master transceiver and the slave transceiver at process 310. The negotiation process 310 is for determining which one of the master and slave transceivers will remain in its default injection state (maintains the same LO frequency) while the other one of the master and slave transceivers changes its injection mode (switches to a different LO frequency).

As indicated in FIG. 3, the negotiation process between master and slave transceivers is optional. For example, according to other embodiments, two transceivers that are intended to be used together are may be pre-configured so that one transceiver performs high-side injection and the other transceiver performs low-side injection. An example of two such transceivers may be, for instance, a wireless keyboard and a USB dongle. In such a situation no negotiation would be required.

In process 320, the injection mode of one of the master and slave transceivers is changed based upon the result of the negotiation process 310. The change results in configuration of the master and slave transceivers such that one of the master and slave transceivers is configured for high-side injection, while the other one of the master and slave transceivers is configured for low-side injection.

As indicated in FIG. 3, the process 320 is also optional. For example, it may be the case that the outcome of process 310 determines that the master and slave transceivers are already configured such that one of the master and slave transceivers is configured for high-side injection, while the other one of the master and slave transceivers is configured for low-side injection. In such a situation, it would not be necessary to change the configuration of one of the master or slave transceivers.

In process 330, a transmission from the master transceiver to the slave transceiver occurs. At the time of the transmission, the LO of the master transceiver has a frequency of $F_{LO(M)}$=X Hz, while the LO of the slave transceiver has a frequency of $F_{LO(S)}$=Y Hz. The signal transmitted from the master transceiver is also at X Hz. If Y>X, then the slave transceiver performs high-side injection. However, if Y<X, then the slave transceiver performs low-side injection. For the particular example given in FIG. 2, $F_{LO(M)}$=2402 MHz and $F_{LO(S)}$=2403 MHz, so high-side injection is performed by the slave device.

In process 340, a transmission from the slave transceiver to the master transceiver occurs. Between process 330 and process 340, the LO of the master transceiver is maintained at a frequency of $F_{LO(M)}$=X Hz, while the LO of the slave transceiver is maintained at a frequency of $F_{LO(S)}$=Y Hz. The signal transmitted from the slave transceiver is also at Y Hz. If X>Y, then the master transceiver performs high-side injection. If X<Y, then the master transceiver performs low-side injection. For the particular example given in FIG. 2, $F_{LO(M)}$=2402 MHz and $F_{LO(S)}$=2403 MHz, so low-side injection is performed by the master device.

Figure 4:
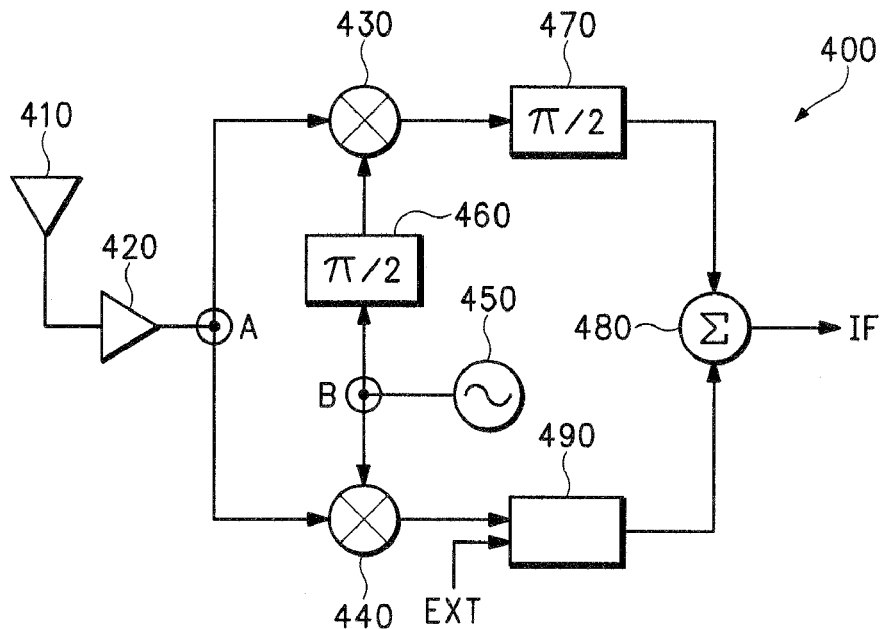
FIG. 4 is a block diagram illustrating a receiver circuit according to some embodiments of the invention.

FIG. 4 is a block diagram illustrating a receiver circuit 400 according to some embodiments of the invention.

Referring to FIG. 4, the receiver circuit 400 includes an input from an antenna 410 and a low noise amplifier 420, the low noise amplifier having an output and an input that is coupled to the input from the antenna.

The receiver circuit 400 further includes a quadrature mixer 430 and an in-phase mixer 440, which are both coupled to the output of the low noise amplifier 420.

The receiver circuit 400 further includes a local oscillator LO 450, whose output is connected directly to the in-phase mixer 440.

The receiver circuit 400 further includes a first quadrature phase shift block 460, which phase shifts the output of the LO 450 by a quarter wavelength ($\pi$/2) before supplying it as input to the quadrature mixer 430.

The receiver circuit 400 further includes a second quadrature phase shift block 470. The second quadrature phase shift block 470 is coupled to an output of the quadrature mixer 430, and supplies a quarter wavelength ($\pi$/2) of phase shift to the output of the quadrature mixer.

The receiver circuit 400 further includes a selectable inverter 490. The input of the selectable inverter 490 includes the output of the in-phase mixer 440 and an external control signal EXT. The selectable inverter 490 is configured to generate as output either the output of the in-phase mixer 440 or an inverted version of the output of the in-phase mixer according to the state of the external control signal EXT.

The receiver circuit 400 further includes a summer 480. The summer 480 performs a summing function on the output of the second quadrature phase shift block 470 and the output of the selectable inverter 490, producing an intermediate frequency IF output.

Figure 5:
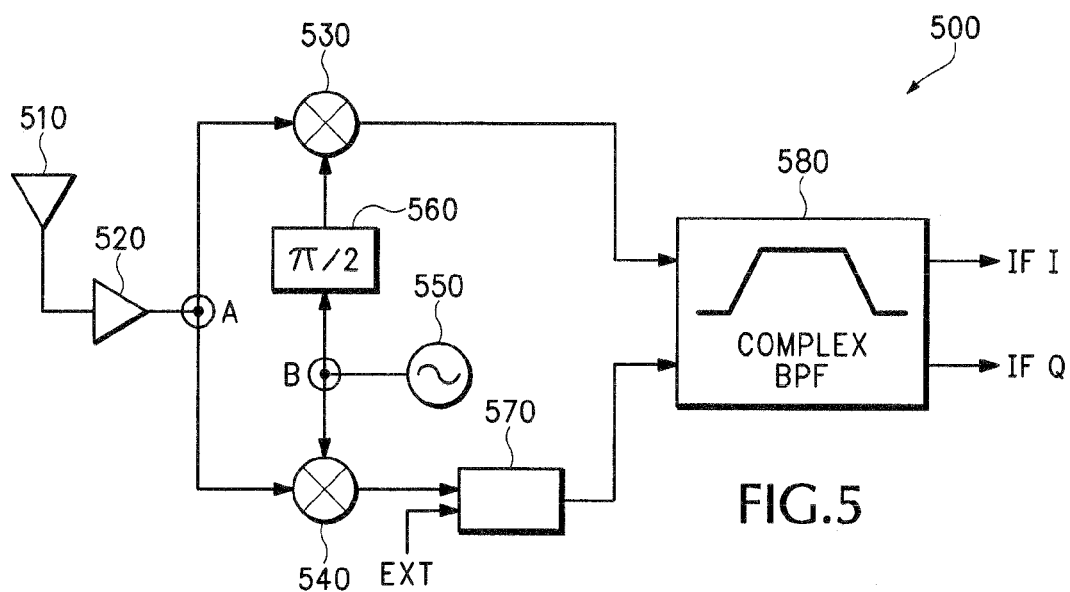
FIG. 5 is a block diagram illustrating a receiver circuit according to some other embodiments of the invention.

FIG. 5 is a block diagram illustrating a circuit 500 according to some other embodiments of the invention.

Referring to FIG. 5, a receiver circuit 500 includes an input from an antenna 510 and a low noise amplifier 520, the low noise amplifier having an output and an input that are coupled to the input from the antenna.

The receiver circuit 500 further includes a quadrature mixer 530 and an in-phase mixer 540, which are both coupled to the output of the low noise amplifier 520.

The receiver circuit 500 further includes a local oscillator LO 550, whose output is connected directly to the in-phase mixer 540.

The receiver circuit 500 further includes a first quadrature phase shift block 560, which phase shifts the output of the LO 550 by a quarter wavelength ($\pi$/2) before supplying it as input to the quadrature mixer 530.

The receiver circuit 500 further includes a selectable inverter 570. The input of the selectable inverter 570 includes the output of the in-phase mixer 540 and an external control signal EXT. The selectable inverter 570 is configured to generate as output either the output of the in-phase mixer 540 or an inverted version of the output of the in-phase mixer according to the state of the external control signal EXT.

The receiver circuit 500 further includes a complex Band Pass Filter (BPF) 580 that is coupled to the outputs of the inphase mixer 540 and the quadrature mixer 530. The BPF 580 includes an Intermediate Frequency In-phase output (IF I) and an Intennediate Frequency Quadrature output (IF Q). In the IF I and IF Q outputs, the image frequency has been rejected by the complex BPF.

Although a low-noise amplifier 420, 520 was included in the embodiments of the invention illustrated in FIGS. 4 and 5, in alternative embodiments the low-noise amplifier need not be present. For example, one could connect an antenna output directly to the input of the image rejection structure if the overall system requirements (such as Gain, noise figure, etc.) could be achieved without using a low-noise amplifier.

Both of the receiver circuits 400, 500 of FIGS. 4 and 5 are agile, where for purposes of this disclosure the term agile refers to the fact that a user may configure the receiver circuits to reject either the low-side image or the high-side image.

A user may accomplish this because, in the circuits illustrated in FIGS. 4 and 5, any one of the signals on any of the ports of the mixers or the phase shifters can be simply inverted, and the opposite side will be rejected. That is, by changing the polarity of one of the signals on either one of the mixers or phase shifters one can cause the circuit 400, 500 to reject the RF signal that is above the LO and pass the other RF signal, or alternatively, cause the circuit to reject the RF signal that is below the LO and pass the other RF signal. In other words, the receiver circuits 400, 500 may be configured to perform either high side injection or low side injection.

The agility of the receiver circuits 400, 500 are provided by the presence of the selectable inverters 490 and 570, which are controlled by the external signal EXT. Depending on the state of the control signal EXT, the selectable inverters 490, 570 generate an output that is either the same as the non-external input to the selectable inverter or an inverted version of the non-external input to the selectable inverter.

The illustrated positions of the selectable inverters 490, 570 within the circuits 400, 500 are exemplary. Since it is typically easier to invert a signal at lower frequencies, according to preferred embodiments of the invention the signal is inverted at the output of either one of the mixers, after the signal has been down-converted into the IF. This situation is illustrated in FIGS. 4 and 5.

Alternatively, in circuit 400, the selectable inverter 490 may be positioned anywhere in the signal path between circuit node A and the summer 480 or between circuit node B and the summer 480. Likewise, in circuit 500, the selectable inverter 570 may be positioned anywhere in the signal path between circuit node A and the CBPF 580 or between circuit node B and the CBPF 580.

Figure 6:
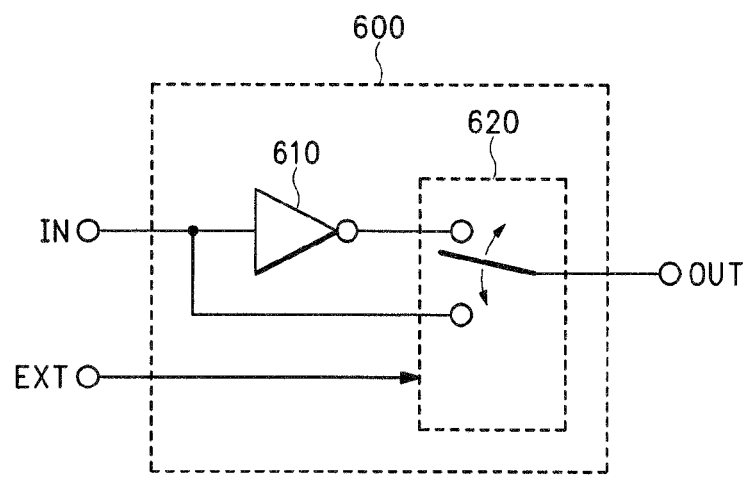
FIG. 6 is a circuit diagram that illustrates a selectable inverter suitable for use with embodiments of the invention.

FIG. 6 is a circuit diagram that illustrates a selectable inverter 600 suitable for use with embodiments of the invention. In particular, the selectable inverters 490 and 570 of FIGS. 4 and 5 may have the structure illustrated by the selectable inverter 600.

The selectable inverter 600 includes an inverter 610 and a two-position switch 620 that is controlled by the external control signal EXT. Depending on the state of the external control signal EXT, the selectable inverter 600 generates at the output OUT either the signal appearing at the input IN or an inverted version of the signal appearing at the input IN.

The structure of the selectable inverter 600 of FIG. 6 is very simple and undoubtedly those of skill in the art would be able to fashion many other equivalent circuits or structures that nonetheless perform the functional equivalent of selectively providing either the input signal or an inverted version of the input signal at an output of the selectable inverter.

In alternative embodiments of the invention, the circuits 400 and 500 may be implemented using differential signals, where the differential pair includes both a true signal and a complementary signal of the true signal. A USB signal, for example, is a differential signal. In this case, the function of the selectable inverters 490 and 570 is to selectively switch the true signal with the corresponding complementary signal in response to the state of the external control signal EXT. This may easily be accomplished with a differential switch or other equivalent circuits, and additional explanation of these specifics is not required for an understanding of this invention.

In the embodiments of the invention described above, the illustrated components of circuits 400, 500 give the circuits the capability to automatically reject the undesired signal, i.e., the circuits are capable of performing image rejection.

However, in alternative circuits according to other embodiments of the invention, the circuit may not include the components required to perform image rejection. For example, although unlikely, it is conceivable that there may be some environments where no image frequencies (no interference) will occur. In this case, there would not be a need to perform image rejection. However, the method of communicating between two transceivers according to embodiments of the invention is still useful at least because, as explained above, it eliminates the latency associated with the requirement to change the LO frequency.

In alternate embodiments of the invention, the improved solution can work with any heterodyne system, where the master and slave are separated by the final IF. That is, there could be multiple conversions in the receiver. In addition, the improved solution can work with any IF frequency. As used in this disclosure, the term "low IF" is a relative term, and should not be interpreted as applying to any particular frequency range.

According to embodiments of the invention, one of the important advantages is that the embodiments eliminate the need to re-lock the frequency synthesizer phase-locked-loop (PLL) when switching from receive to transmit modes. This improves latency in data delivery and improves battery life since the device does not have to remain on as long to send/receive a data packet.

In addition, switching from a high-side injection mode to a low-side injection mode is a very simple matter according to embodiments of the invention. As described above, any signal that is internal to an image reject circuit structure may simply be inverted.

Another important advantage is that embodiments of the invention allow a fast turn around, from transmit to receive mode, in a transceiver that uses a low intermediate frequency (IF). According to embodiments of the invention, the LO or frequency synthesizer remains at the same frequency for transmit and receive, so that the PLL lock time is not incurred on each change of modes.

Embodiments of the invention are well-suited to performing various other processes in addition to the processes described in this disclosure, or variations of the processes described in this disclosure, and in a sequence other than that described in this disclosure. According to some embodiments of the invention, the processes described in this disclosure may be performed by processors and other electrical and electronic components, e.g., components that are capable of executing computer readable and computer executable instructions that include code contained in a computer usable medium.

For purposes of clarity, many of the details of embodiments of the invention and the methods of designing and manufacturing the same that are widely known and not relevant to the invention have been omitted from this disclosure.

It should be appreciated that reference throughout this specification to "one embodiment" or "an embodiment" means that a particular feature, structure, or characteristic described in connection with the embodiment is included in at least one embodiment of the invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim.

Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

The invention claimed is:

1. A transceiver circuit comprising:
   a first signal path between an output of a Local Oscillator (LO) and a first input of a first mixer, the LO to generate a signal at a LO frequency;
   a second signal path between the output of the LO and a first input of a second mixer;
   a third signal path between a first circuit node and a second input of the first mixer, the first circuit node to divide an incoming signal having a desired Radio Frequency (RF) signal;
   a fourth signal path between the first circuit node and a second input of the second mixer;
   a fifth signal path between an output of the first mixer and a converter circuit;
   a sixth signal path between an output of the second mixer and the converter circuit, the converter circuit to generate an Intermediate Frequency (IF) output based upon input arriving on the fifth signal path and the sixth signal path;
   a selectable inverter configured to provide agility to the transceiver circuit, the selectable inverter disposed in a signal path selected from the group consisting of the first, second, third, fourth, fifth, and sixth signal paths;
   wherein the transceiver circuit is configured to negotiate a master/slave relationship with a remote transmitter to determine an output of the selectable inverter; and
   wherein the transceiver circuit is configured to synchronize communications in a transmit mode and a receive mode using the LO, wherein the LO maintains a same LO frequency when in the transmit mode and the receive mode.

2. The transceiver circuit of claim 1, the selectable inverter configured to switch the transceiver circuit between a high-side injection mode and a low-side injection mode by inverting a signal sent along the signal path selected from the group consisting of the first, second, third, fourth, fifth, and sixth signal paths.

3. The transceiver circuit of claim 2, the signal path selected from the group consisting of the fifth and the sixth signal paths.

4. The transceiver circuit of claim 2, the transceiver circuit configured to reject an image frequency of the desired RF signal.

5. The transceiver circuit of claim 2, the selectable inverter configured to invert the signal sent along the signal path in response to an external control signal.

6. The transceiver circuit of claim 1, the converter circuit selected from the group consisting of a summer and a complex band pass filter.

7. A method of communication between a first transceiver having a first local oscillator set at a first frequency and a second transceiver having a second local oscillator set at a second frequency, the method comprising:
   negotiating between the first transceiver and the second transceiver to determine which one of the first and second transceivers will be maintained in a configuration to perform a first injection mode and which one of the first and second transceivers will be changed to a configuration to perform a second injection mode, the second injection mode opposite that of the first injection mode;
   transmitting a first signal from the first transceiver to the second transceiver, the first signal at the first frequency;
   transmitting a second signal from the second transceiver to the first transceiver, the second signal at the second frequency;
   receiving the second signal at the first transceiver; and
   maintaining the first local oscillator at the first frequency and the second local oscillator at the second frequency during the transmitting of the first signal, during the receiving of the first signal, during the transmitting of the second signal, and during the receiving of the second signal.

8. The method of claim 7, wherein one of the first or second injection modes is a high-side injection mode, wherein the other one of the first and second injection modes is a low-side injection mode, and wherein the second signal is transmitted as an acknowledgement of a receipt of the first signal.

9. The method of claim 7, further comprising changing one of the first or second transceivers to the configuration to perform the second injection mode.

10. The method of claim 9, wherein changing the one of the first or second transceivers to the configuration to perform the second injection mode comprises inverting a signal internal to the one of the first or second transceivers.

11. The method of claim 7, further comprising configuring the first transceiver to reject an image of the second frequency.

12. The method of claim 11, further comprising configuring the second transceiver to reject an image of the first frequency.

* * * * *